(12) United States Patent
Eck

(10) Patent No.: US 11,257,202 B2
(45) Date of Patent: *Feb. 22, 2022

(54) AUTOMATICALLY EXECUTING A TEST TO INSPECT AN END FACE OF AN OPTICAL FIBER WHEN AN IMAGE IS IN FOCUS

(71) Applicant: VIAVI Solutions Inc., San Jose, CA (US)

(72) Inventor: Jonathan Eck, Bothell, WA (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,518

(22) Filed: Nov. 2, 2020

(65) Prior Publication Data

US 2021/0049751 A1 Feb. 18, 2021

Related U.S. Application Data

(63) Continuation of application No. 16/440,837, filed on Jun. 13, 2019, now Pat. No. 10,825,163.

(51) Int. Cl.

| | |
|---|---|
| *G06T 7/00* | (2017.01) |
| *G01M 11/00* | (2006.01) |
| *G02B 21/00* | (2006.01) |
| *G02B 21/36* | (2006.01) |
| *G02B 21/24* | (2006.01) |

(52) U.S. Cl.
CPC .......... *G06T 7/0004* (2013.01); *G01M 11/30* (2013.01); *G02B 21/0016* (2013.01); *G02B 21/241* (2013.01); *G02B 21/365* (2013.01); *G02B 21/368* (2013.01); *G06T 2200/24* (2013.01); *G06T 2207/10056* (2013.01)

(58) Field of Classification Search
None
See application file for complete search history.

(56) References Cited

U.S. PATENT DOCUMENTS

| | | | | |
|---|---|---|---|---|
| 4,762,417 | A | * | 8/1988 | Wu .......................... G01J 9/02 356/477 |
| 4,818,886 | A | | 4/1989 | Drucker |
| 5,140,167 | A | * | 8/1992 | Shaar ..................... G01B 11/26 250/559.22 |
| 5,459,564 | A | * | 10/1995 | Chivers ................... G01B 9/04 356/477 |
| 5,933,187 | A | | 8/1999 | Hirasawa et al. |
| 7,113,626 | B1 | | 9/2006 | Dar |

(Continued)

OTHER PUBLICATIONS ip.com, "Search Report; Capturing, Using a camera", 1 page.

*Primary Examiner* — Mohammad J Rahman
(74) *Attorney, Agent, or Firm* — Harrity & Harrity, LLP

(57) ABSTRACT

A device may use a camera to capture an image of an end face of an optical fiber in a field of view of the camera. The device may monitor a focus metric associated with the image while the image is manually focused using an optomechanical assembly. The device may automatically initiate a test to inspect the image of the end face of the optical fiber for compliance with a set of criteria related to cleanliness and damage based on the focus metric satisfying a condition. The device may output a result from the test indicating whether the end face of the optical fiber satisfies the set of criteria related to cleanliness and damage.

20 Claims, 12 Drawing Sheets

(56) References Cited

U.S. PATENT DOCUMENTS

| | | |
|---|---|---|
| 9,213,625 B1 | 12/2015 | Schrage |
| 9,626,577 B1 | 4/2017 | Yu et al. |
| 10,825,163 B1 | 11/2020 | Eck |
| 2003/0007128 A1* | 1/2003 | Wei ................. A61B 3/024 351/239 |
| 2004/0076319 A1* | 4/2004 | Fauver ............ G01N 21/4795 382/133 |
| 2004/0213449 A1 | 10/2004 | Safaee-Rad et al. |
| 2010/0097515 A1 | 4/2010 | Ishii |
| 2010/0241507 A1 | 9/2010 | Quinn et al. |
| 2011/0085159 A1 | 4/2011 | Levin et al. |
| 2013/0229650 A1* | 9/2013 | Wilson ................. G01B 11/30 356/73.1 |
| 2014/0092503 A1 | 4/2014 | Ostrovsky |
| 2014/0240578 A1 | 8/2014 | Fishman et al. |
| 2015/0130849 A1 | 5/2015 | Thompson et al. |
| 2015/0135164 A1 | 5/2015 | Bright et al. |
| 2015/0221211 A1 | 8/2015 | Barrieau et al. |
| 2015/0316833 A1 | 11/2015 | Watanabe et al. |
| 2015/0320319 A1* | 11/2015 | Alfano ................ A61B 5/4381 600/425 |
| 2016/0198951 A1 | 7/2016 | Fujino et al. |
| 2017/0258401 A1 | 9/2017 | Volpe |
| 2018/0300940 A1* | 10/2018 | Sakthivel ............... G06T 15/06 |
| 2018/0348143 A1 | 12/2018 | Ahlstrom et al. |
| 2019/0000044 A1 | 1/2019 | Prakash et al. |
| 2019/0243364 A1 | 8/2019 | Cohen |
| 2019/0362557 A1 | 11/2019 | Lacey et al. |

\* cited by examiner

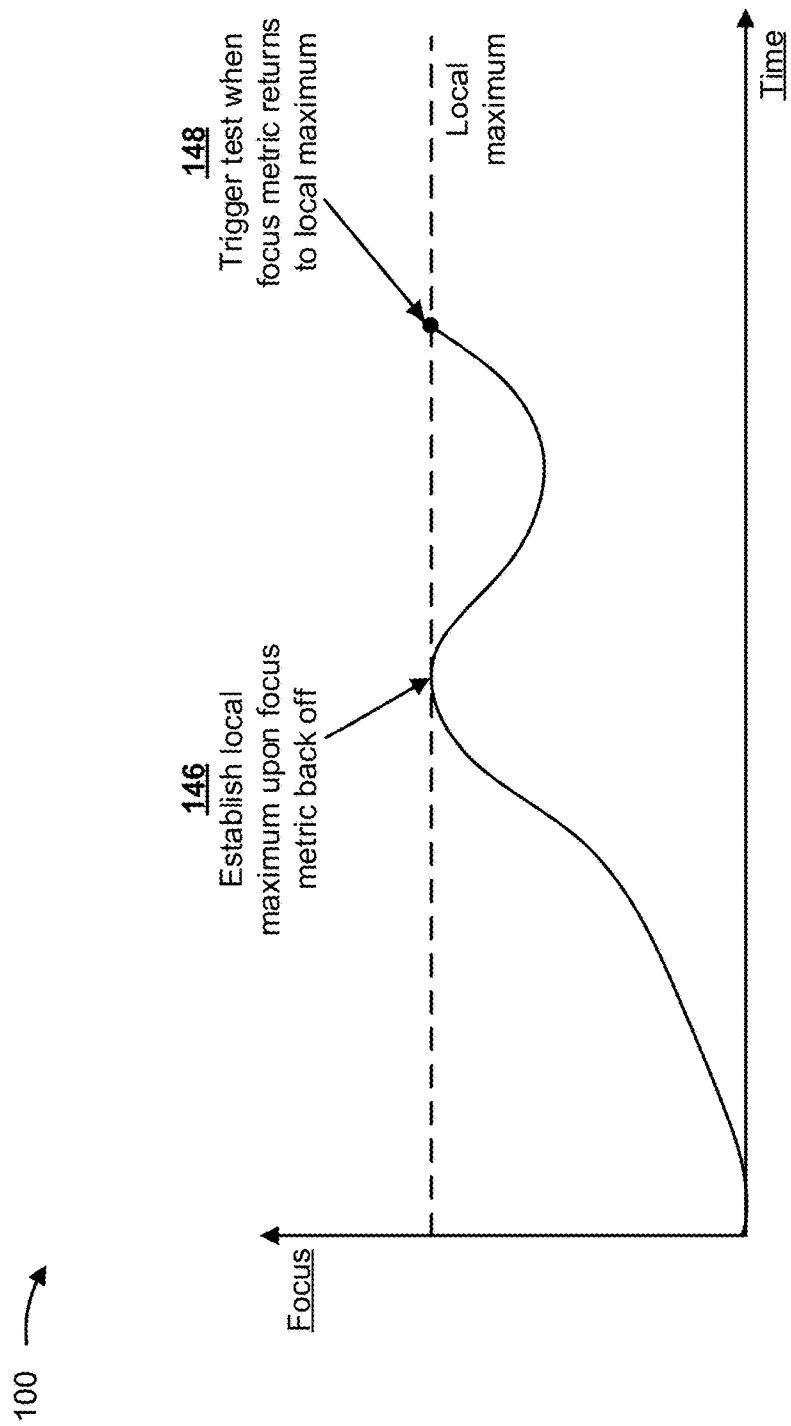

AUTOMATICALLY EXECUTING A TEST TO INSPECT AN END FACE OF AN OPTICAL FIBER WHEN AN IMAGE IS IN FOCUS

RELATED APPLICATION

This application is a continuation of U.S. patent application Ser. No. 16/440,837, filed Jun. 13, 2019 (now U.S. Pat. No. 10,825,163), which is incorporated herein by reference.

BACKGROUND

A microscope may include an instrument used to see objects that are too small to be seen by the naked eye. Microscopy may include investigating small objects and structures using a microscope. A microscope may include an optical microscope, which uses light passed through a sample to produce an image, a fluorescence microscope, an electron microscope, a scanning probe microscope, and/or the like. In some cases, a microscope may be used to analyze optical fibers of an optical cable.

SUMMARY

According to some implementations, a method may include capturing, using a camera, an image of an end face of an optical fiber within a field of view of the camera. The method may include monitoring a focus metric associated with the image while the image is manually focused using an opto-mechanical assembly. The method may include automatically initiating a test to inspect the image of the end face of the optical fiber based on determining that the focus metric satisfies a condition, wherein automatically initiating the test causes an image analysis component to analyze the image of the end face of the optical fiber for compliance with a set of criteria related to cleanliness and damage of the end face of the optical fiber. The method may include outputting a result from the test that indicates whether the end face of the optical fiber satisfies the set of criteria related to cleanliness and damage.

According to some implementations, a device may include a camera configured to capture an image of an end face of an optical fiber within a field of view of the camera; one or more manually operated focus control components; and one or more processors. The one or more processors may activate software that causes the one or more processors to automatically initiate a test to inspect the image of the end face of the optical fiber for compliance with a set of criteria related to cleanliness and damage when the image of the end face is in focus. The one or more processors may monitor a focus metric associated with the image of the end face while the image is manually focused using the one or more manually operated focus control components. The one or more processors may automatically initiate the test to inspect the image of the end face of the optical fiber for compliance with the set of criteria related to cleanliness and damage based on determining that the focus metric satisfies a focus metric threshold value. The one or more processors may output a result from the test that indicates whether the end face of the optical fiber satisfies the set of criteria related to cleanliness and damage.

According to some implementations, a non-transitory computer-readable medium may store one or more instructions. The one or more instructions, when executed by one or more processors of a device, may cause the one or more processors to activate, based on a user input, software that causes the one or more processors to automatically initiate a test to inspect an image of an end face of an optical fiber when the image of the end face is in focus. The one or more instructions may cause the one or more processors to monitor a focus metric associated with the image while one or more focus control components are manually actuated to adjust a focus of the image. The one or more instructions may cause the one or more processors to determine a local maximum for the focus metric associated with the image while the one or more focus control components are manually actuated to adjust the focus of the image, wherein the local maximum is a maximum value of the focus metric that precedes a decrease in a value of the focus metric while the one or more focus control components are manually actuated to adjust the focus of the image. The one or more instructions may cause the one or more processors to automatically initiate the test to inspect the image of the end face of the optical fiber for compliance with a set of criteria related to cleanliness and damage based on determining that the focus metric has reached the local maximum a second time. The one or more instructions may cause the one or more processors to output a result from the test that indicates whether the end face of the optical fiber satisfies the set of criteria related to cleanliness and damage.

BRIEF DESCRIPTION OF THE DRAWINGS

FIGS. 1A-1G are diagrams of one or more example implementations described herein.

DETAILED DESCRIPTION

Figure 1A:
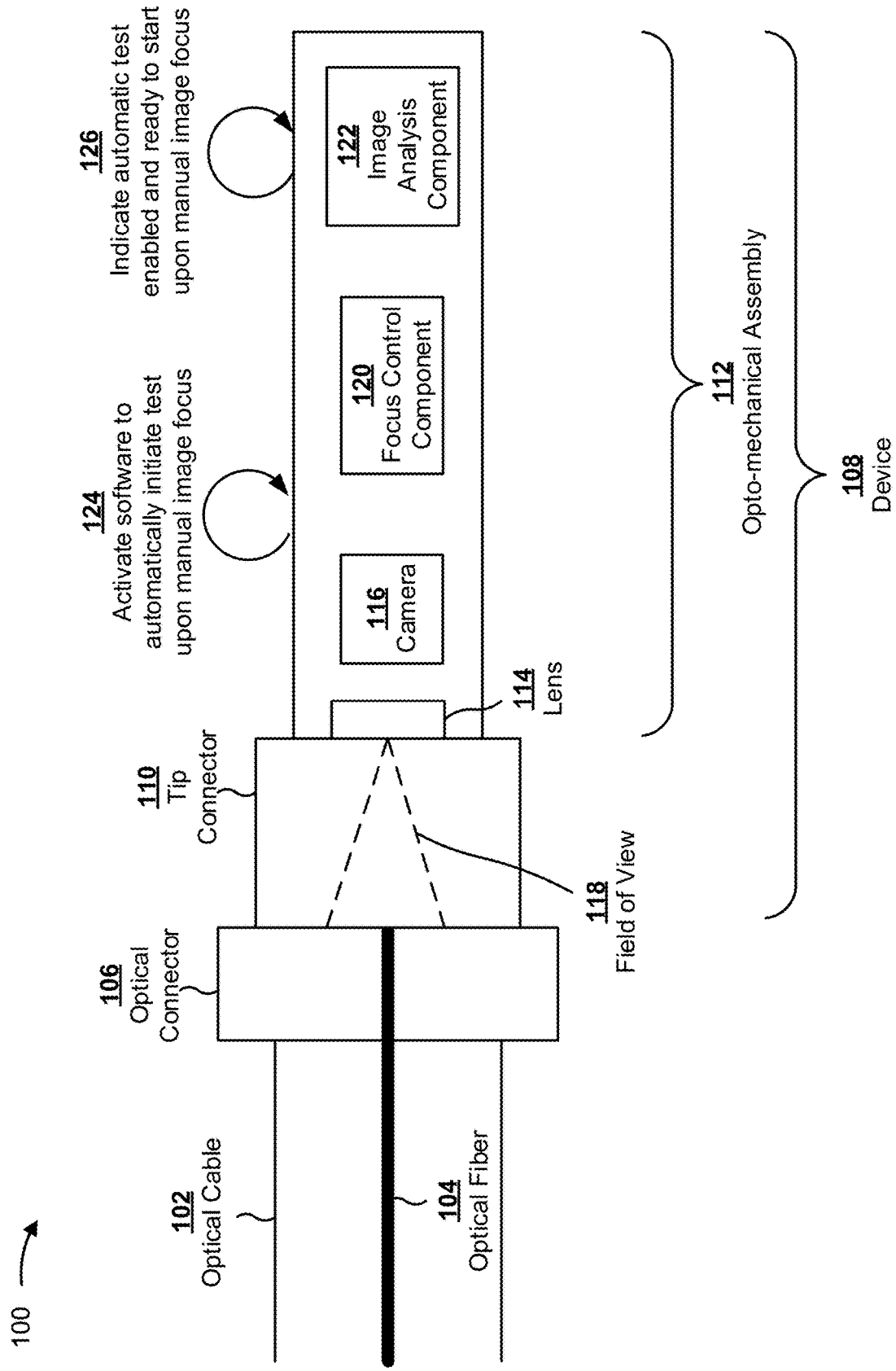

The following detailed description of example implementations refers to the accompanying drawings. The same reference numbers in different drawings can identify the same or similar elements.

A technician may use a device, such as a handheld optical fiber microscope, to inspect an end face of an optical fiber of an optical cable prior to connecting the optical cable to network equipment. For example, the optical fiber may be placed in a field of view of the device, and the device may capture images, live video, and/or the like, of an end face of the optical fiber so that the device (and/or another device) may analyze the images for dirt particles, dust particles, scratches, and/or other surface defects. The device may need to capture images with a high focus in order to perform an accurate analysis of the end face of the optical fiber.

In some cases, the device may have a capability to automatically adjust a focus of the field of view (e.g., without input from a technician), manually adjust the focus of the field of view (e.g., based on an input received from the technician), and/or the like. In some cases, the device may be unable to fully achieve the high focus needed to accurately analyze the end face of the optical fiber using the automatic focus capability. For example, some optical fibers may have optical characteristics that prevent automatic focus algorithms from working efficiently, in which case the technician may be forced to rely on manual focus capabilities.

However, manual focus controls also present challenges due to mechanical variability in functioning of the device (e.g., accuracy of mechanical movement, wear of mechanical parts, and/or the like) and/or technician error (e.g., movement by the technician). For example, when using manual focus controls, the technician may adjust the focus in the field of view too quickly, which may cause the device to overshoot the point of optimal focus in the field of view. Additionally, or alternatively, the technician may adjust the focus in the field of view too slowly, which may increase the amount of time needed to achieve the point of optimal focus in the field of view. Furthermore, when using the device to perform automated end face inspection prior to connecting the optical cable, the technician typically has to press a button (e.g., on the device, on a user interface, and/or the like) to initiate the test after the image is manually brought into high focus. However, when testing fiber connectors with difficult to focus optics, in tight spaces, awkward placement, and/or the like, manually achieving the high focus needed to enable accurate analysis can be difficult to achieve and maintain while the technician moves his/her finger to press the button to initiate the test. For example, the optical fiber may be relatively unstable and/or easily perturbed, which may result in the image losing focus in the time it takes for the technician to move his/her finger from the manual focus controls to the test button.

Some implementations described herein may automatically initiate a test to inspect an end face of an optical fiber when an image of the end face is manually focused. For example, a technician may insert the optical fiber into a device, such as a handheld optical fiber microscope, and the technician may press a button on the device, on a graphical user interface, and/or the like to activate software to automatically initiate the test when the image is manually focused. While in the activated state, the technician may use one or more manual focus controls (e.g., a rotatable wheel, a focus ring, a knob, a button, and/or the like) to focus the image, and the activated software may automatically initiate the test to inspect the end face of the optical fiber when a focus metric satisfies a condition. For example, the condition may be satisfied when the focus metric satisfies a focus metric threshold value, when the focus metric satisfies the focus metric threshold value for a threshold time duration, when the focus metric passes through a local maximum and subsequently reaches the local maximum again, and/or the like. The test may analyze the image for compliance with a set of criteria related to cleanliness and damage (e.g., to determine whether the end face is free of dust particles, dirt particles, scratches, and/or the like), and the device may output a result from the test to indicate whether the optical fiber can be connected or needs to be tested again after being cleaned, repaired, replaced, and/or the like.

In this way, by enabling the technician to focus mental and physical energy into stabilizing and focusing the optical fiber without having to simultaneously maintain high focus and press a test button, implementations described herein conserve computing resources (e.g., processor resources, memory resources, and/or the like) that would otherwise be wasted capturing and analyzing out-of-focus images or images that otherwise cannot yield accurate test results. Furthermore, by automatically initiating the test when the focus metric satisfies the condition, implementations described herein may ensure that the image(s) used in the test have a sufficiently high focus and/or quality that may enable an accurate test result. In this way, an accurate test result may ensure that an optical fiber is not connected with a scratched, dirty, or damaged end face, as these defects can substantially degrade network performance, potentially cause an entire network link to fail, and/or the like.

FIGS. 1A-1G are diagrams of one or more example implementations 100 described herein. As shown in FIG. 1A, example implementation(s) 100 may include an optical cable 102 that includes one or more optical fibers 104, and an optical connector 106 that is attached to the optical cable 102. For example, the optical fiber 104 may be mounted in an interstitial material within the optical connector 106 connected to the optical cable 102. Furthermore, example implementation(s) 100 may include a device 108 (e.g., a handheld device 108) to be used to analyze the optical fiber 104 (e.g., by inspecting an image of an end face of the optical fiber 104). The device 108 may include a tip connector 110 that permits the device 108 to attach to the optical cable 102 via the optical connector 106. Furthermore, as shown in FIG. 1A, the device 108 may include an opto-mechanical assembly 112 to be used to move a microscope relative to the optical fiber 104 to obtain (e.g., capture) a set of images and/or video of the end face of the optical fiber 104 and/or to analyze the end face of the optical fiber 104.

The opto-mechanical assembly 112 may include various components to be used to analyze the end face of the optical fiber 104 (e.g., electronic components, optical components, mechanical components, and/or the like). For example, the opto-mechanical assembly 112 may include a microscope that includes a lens 114 for viewing the optical fiber 104. As further shown in FIG. 1A, the microscope of the opto-mechanical assembly 112 may include a camera 116 to be used to capture a set of images and/or video of the end face of the optical fiber 104. For example, the camera 116 may capture a set of images and/or video to be analyzed by the device 108 (or another device communicatively connected to device 108) to determine whether the end face of the optical fiber 104 is dirty, damaged, has surface defects, and/or the like. Continuing with the previous example, the device 108 may provide the set of images and/or video to a server or a computing resource (e.g., of a cloud computing environment) to permit the server or the computing resource to perform an analysis of the set of images and/or video. In some implementations, the device 108 may use the camera 116 to capture an image and/or video of objects within a field of view 118 of camera 116.

As further shown in FIG. 1A, the opto-mechanical assembly 112 may include a focus control component 120 for controlling the microscope of the opto-mechanical assembly 112. The focus control component 120 may include one or more mechanical components for manually adjusting the focus of the image, such as a focus control wheel that can be manually rotated or otherwise operated to adjust the focus in the field of view 118 by moving the lens 114 relative to the camera 116 and/or the optical fiber 104 (e.g., by moving the lens 114 in a side-to-side direction, by moving the lens 114 in an up-and-down direction, by moving the lens 114 closer to the optical fiber 104, by moving the lens 114 further from the optical fiber 104, and/or the like). Additionally, or alternatively, the focus control component 120 may include a focus ring, a knob, a button, and/or other suitable components that can be manually actuated or manually operated to adjust the focus in the field of view 118.

As further shown in FIG. 1A, the device 108 may include an image analysis component 122 for performing a test to analyze images, video, and/or the like captured using the camera 116. For example, the image analysis component 122 may analyze one or more images of an end face of the optical fiber 104 that are captured using the camera 116 to determine whether the end face of the optical fiber 104 complies with a set of criteria that relates to cleanliness and damage. For example, the set of criteria may include pass/fail requirements for connector end face quality for different types of fiber connectors (e.g., Single-Mode Physical Contact (SM-PC) connectors, Single-Mode Ultra Physical Contact (SM-UPC) connectors, Single-Mode Angled Physical Contact (SM-APC) connectors, Multi-Mode (MM) connectors, multi-fiber connectors, and/or the like). In some implementations, the image analysis component 122 may analyze various regions or zones within the image(s) to determine whether the image(s) include one or more features that indicate that the end face of the optical fiber 104 is dirty or damaged, and may generate a pass result or a fail result (e.g., based on one or more industry standards, such as International Electrotechnical Commission (IEC) Standard 61300-3-35).

As further shown in FIG. 1A, and by reference number 124, the device 108 may enable software to automatically initiate a test to inspect an image of the end face of the optical fiber 104 when the image is manually focused. For example, in some implementations, the device 108 may include a physical test button, and the software to automatically initiate the test may be activated based on a user pressing the physical button. Additionally, or alternatively, the device 108 may display a graphical user interface (e.g., on a display of the device 108, an external device connected to the device 108 via a wired or wireless connection, and/or the like), and the graphical user interface may include a graphical test button that, when pressed, activates the software to automatically initiate the test upon a user or technician manually focusing the image. Additionally, or alternatively, the software to automatically initiate the test may be activated by default (e.g., without a user having to press a physical or graphical test button to activate the software).

As further shown in FIG. 1A, and by reference number 126, the device 108 may indicate that the software to automatically initiate the test has been activated, whereby the test may be ready to start upon the user manually focusing the image of the end face of the optical fiber 104 within the field of view 118. For example, in some implementations, the device may cause the graphical user interface to display status information indicating that the test will be automatically initiated when the image is manually focused. Additionally, or alternatively, the device 108 may include a light emitting diode (LED) that changes to a particular color when the software to automatically initiate the test has been activated.

Figure 1B:
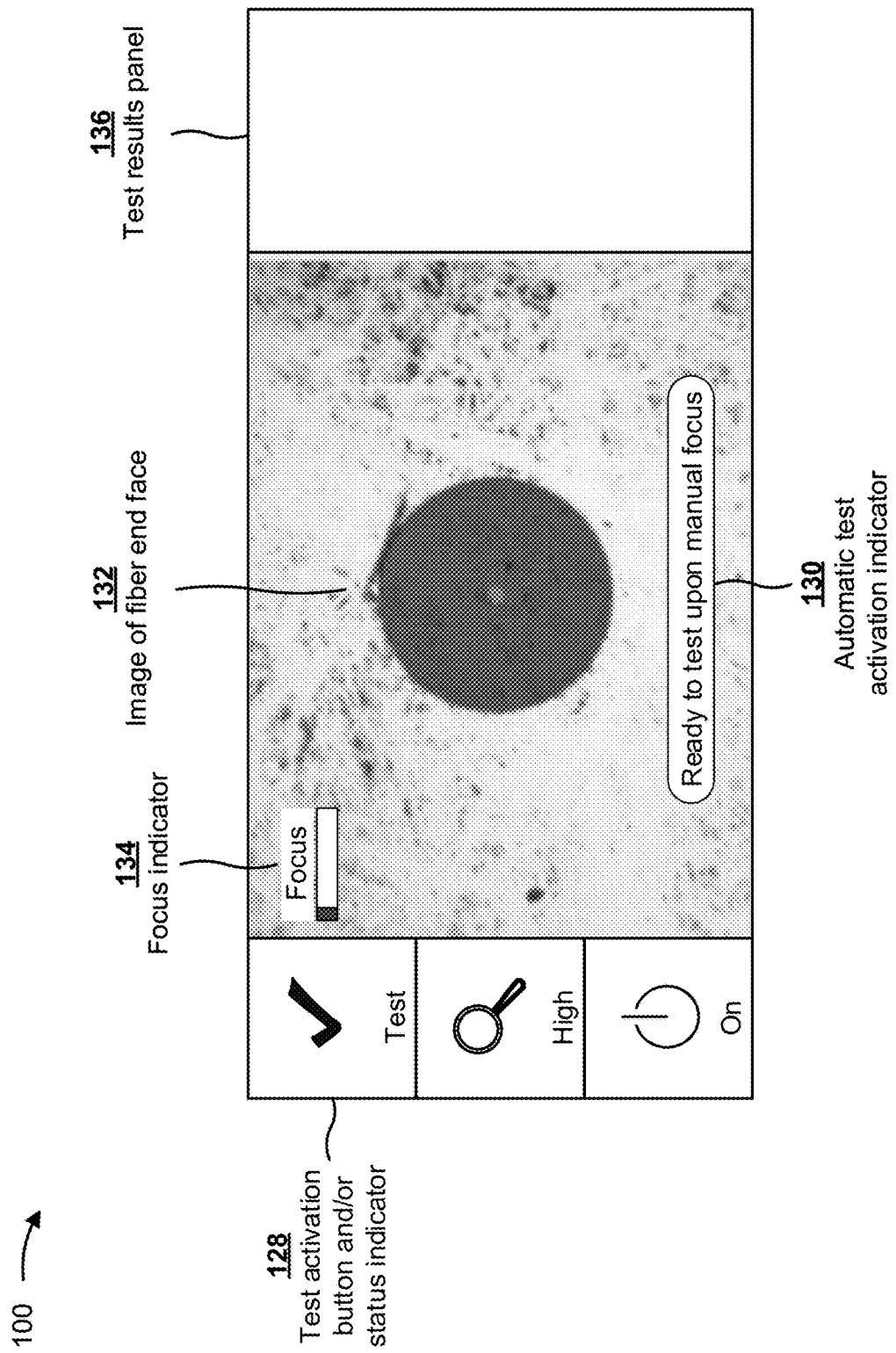

For example, as shown in FIG. 1B, the graphical user interface may include various visual elements to indicate a status of the test, the image of the end face of the optical fiber 104, and/or the like. For example, as shown in FIG. 1B, the graphical user interface includes a test activation button and/or status indicator 128 to indicate the status of the test. In some implementations, the user or technician operating the device 108 may press the test activation button and/or status indicator 128 to activate the software to automatically initiate the test upon manual focus, and a visual characteristic of the test activation button and/or status indicator 128 may change to indicate that the device 108 is ready to automatically initiate the test when the image is manually focused (e.g., the test activation button and/or status indicator 128 may display a check mark, change color, and/or the like when the automatic test feature has been activated). Additionally, or alternatively, the visual characteristic of the test activation button and/or status indicator 128 may change to indicate that the device 108 is ready to automatically initiate the test when the user presses the physical test button on the device 108. Furthermore, the user may deactivate the software used to automatically initiate the test by pressing the physical test button, the test activation button and/or status indicator 128, and/or the like while the software is activated. In this way, if the user is not ready to start the test, deactivating the software conserves computing resources that would otherwise be wasted monitoring a focus metric to determine whether the focus metric satisfies a condition to trigger the test.

As further shown in FIG. 1B, and by reference number 130, the graphical user interface may include a status message to indicate that the automatic test feature has been activated. For example, as shown in FIG. 1B, the status message may read "Ready to test upon manual focus," or another suitable indicator (e.g., a visual indicator, an audible indicator, and/or the like) may be used to convey that the automatic test feature has been activated. In this way, the user or technician operating the device 108 may be informed that the automatic test feature is activated and ready.

As further shown in FIG. 1B, and by reference number 132, the graphical user interface may display the image of the end face of the optical fiber 104 within the field of view 118 of the camera 116. As further shown in FIG. 1B, and by reference number 134, the graphical user interface may include a focus indicator to indicate a current level of focus in the image. In this way, the user operating the device 108 can view the image of the end face of the optical fiber 104 within the field of view 118 of the camera 116 and may be informed about the current level of focus in the image, which may aid the user in manually adjusting the focus to an appropriate level sufficient to obtain an accurate test result. In some implementations, the image of the end face of the optical fiber 104 and the focus indicator may be automatically refreshed or otherwise updated as the user manually operates the focus control component 120 to manually adjust the level of focus in the image. For example, as the level of focus increases, the bar in the focus indicator may go higher and change color (e.g., to green) when the level of focus satisfies one or more conditions indicating that the image is in high focus to enable an accurate test.

As further shown in FIG. 1B, the graphical user interface may include one or more additional elements to assist the user in focusing the image, initiating the test, interpreting a result of the test, and/or the like. For example, as shown by reference number 136, the graphical user interface may include a test results panel, which is empty in the illustrated example because the test has not yet been performed. Furthermore, as shown in FIG. 1B, the graphical user interface may include a magnification button that can be set to high, medium, low, and/or the like to adjust a level of magnification for the image of the end face of the optical fiber 104. Furthermore, as shown in FIG. 1B, the graphical user interface may include an on/off button that may enable the user to enable or disable the graphical user interface, turn the device 108 on or off, and/or the like. Additionally, or alternatively, the graphical user interface may include one or more options to save a test result after a test has been performed (e.g., to preserve a record demonstrating that the optical fiber 104 complied with the set of criteria related to cleanliness and damage prior to connection), to indicate the type of connector used (e.g., to configure the pass/fail requirements for the test), and/or the like.

Figure 1C:
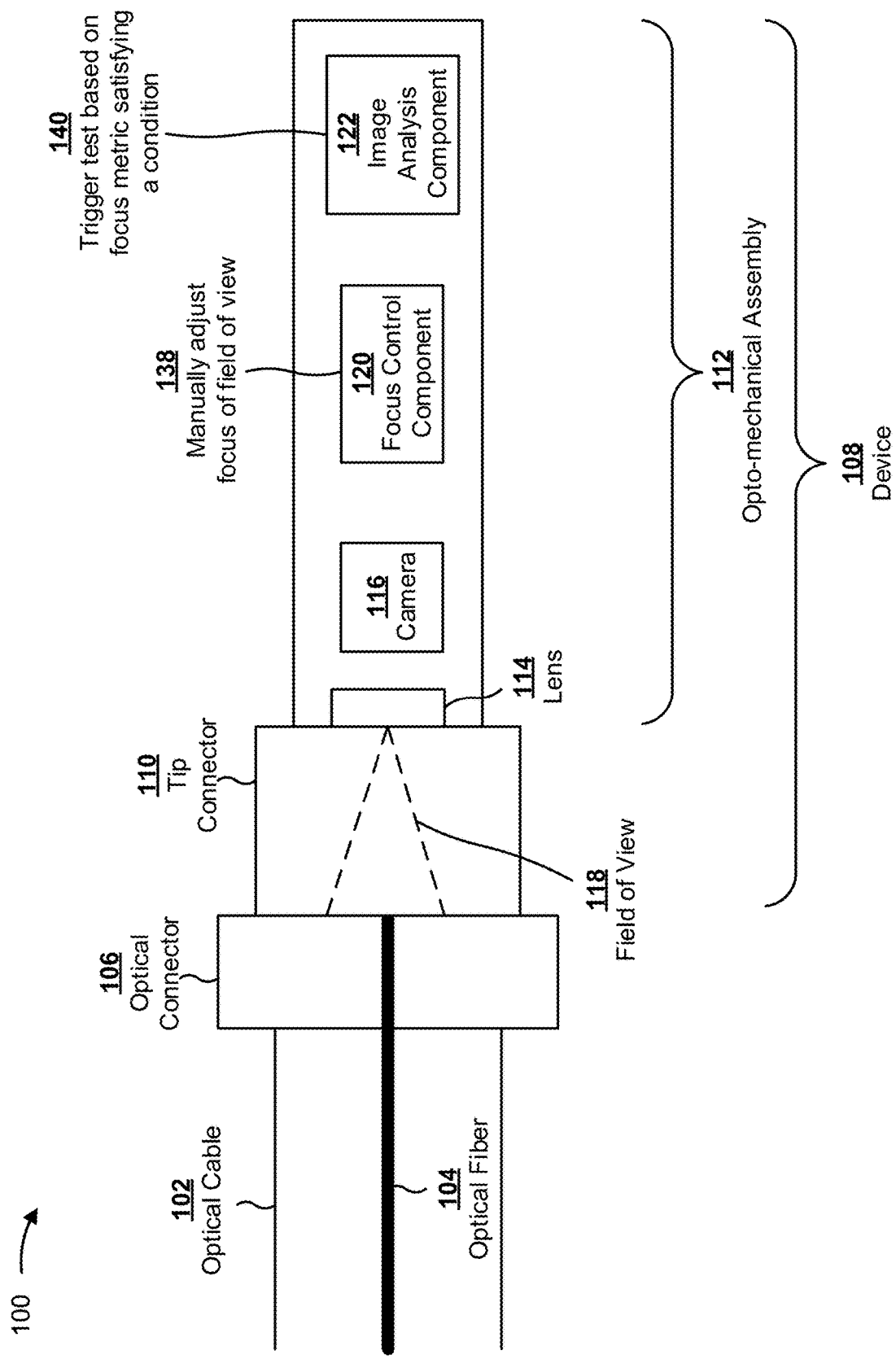

As shown in FIG. 1C, and by reference number 138, a user operating the device 108 may manually operate the focus control component 120 to manually adjust the focus in the field of view 118. For example, the user may rotate, actuate, or otherwise operate the focus control component 120 to adjust the focus in the field of view 118. In some implementations, the image analysis component 122 may monitor a value of a focus metric while the user manually adjusts the focus of the field of view 118. For example, in some implementations, the image analysis component 122 may determine the value of the focus metric using a contrast detection technique, which may include measuring an intensity difference between adjacent pixels, as the intensity difference generally increases with correct image focus. In another example, the image analysis component 122 may determine the value of the focus metric using a phase detection technique in which incoming light is divided into a pair of images (e.g., using a beam splitter). Accordingly, the pair of images may be compared for similar light intensity patterns (e.g., peaks and valleys) and a separation error may be calculated in order to determine the value of the focus metric. As further shown in FIG. 1C, and by reference number 140, the device 108 may automatically initiate or trigger the test based on the focus metric satisfying a condition, at which point the user or technician operating the device 108 can stop efforts to actively stabilize the optical fiber 104 because the image data needed to perform the test has already been captured.

Figure 1D:
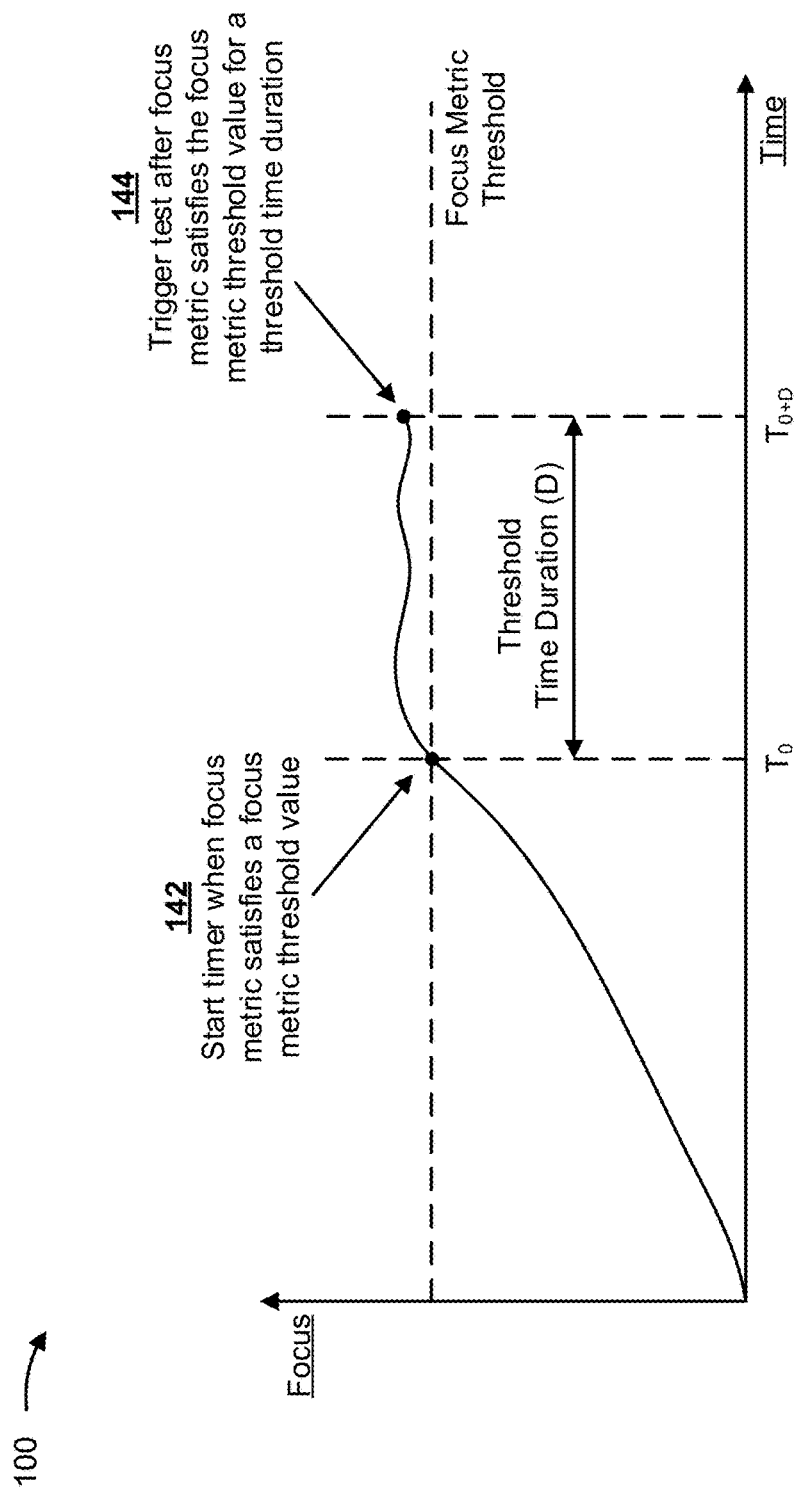

For example, as shown in FIG. 1D, the device 108 may automatically initiate or otherwise trigger the test based on the focus metric satisfying a focus metric threshold value. For example, as shown by reference number 142, the device 108 may start a timer when the focus metric satisfies the focus metric threshold value, which occurs at time $T_0$ in the illustrated example. As further shown in FIG. 1D, and by reference number 144, the test may be automatically triggered after the focus metric satisfies the focus metric threshold value for a threshold time duration (D), which occurs at time $T_{0+D}$ in the illustrated example. The threshold time duration may be a configurable value that is sufficiently long to ensure that the image is in stable focus and sufficiently short to ensure that the test is initiated prior to hand tremor, mechanical displacement, and/or other factors resulting in a loss of focus. For example, the threshold time duration may be set to 500 milliseconds, 1000 milliseconds, and/or another suitable value. In this way, the test may not be triggered instantaneously when the focus metric initially satisfies the focus metric threshold value due to the possibility that the optical fiber 104 may be perturbed. Accordingly, the additional condition that the focus metric satisfy the focus metric threshold value for the threshold time duration may ensure that the image is in focus and stable prior to capturing the image used to perform the test. Nonetheless, in some implementations, the test may be automatically initiated when the focus metric initially satisfies the focus metric threshold value, with the possibility that a suboptimal test result may be produced, the test may need to be repeated, and/or the like if the image is out-of-focus when the test is initiated.

In another example, as shown in FIG. 1E, the device 108 may automatically initiate or otherwise trigger the test based on the focus metric passing through a local maximum, backing off the local maximum, and then reaching the local maximum again. For example, in some cases, the user may manually operate the focus control component 120 by rotating or otherwise actuating one or more mechanical components, which may cause the focus in the image to increase. At some point, as the user continues to manually operate the focus control component 120, the focus may reach a maximum value before the focus starts to decrease or otherwise worsen. The user may then manually operate the focus control component 120 in a reverse direction in an effort to return the focus to the previous maximum value.

Accordingly, as shown in FIG. 1E, and by reference number 146, the focus metric may establish a local maximum when the focus metric peaks and then starts to back off. In other words, the local maximum is a maximum value of the focus metric that precedes a decrease in a value of the focus metric while the focus control component 120 is manually actuated to adjust the focus of the image. As the user continues to manually actuate the focus control component 120 (e.g., in a reverse direction after the focus metric starts to back off), the focus may again increase and start to approach the previously established local maximum. Accordingly, as shown in FIG. 1E, the test may be automatically triggered when the focus metric returns to the local maximum. In this way, the local maximum may establish an optimal or maximum level of focus that can be achieved in the image, whereby automatically triggering the test when the focus metric returns to the local maximum may ensure that the test is performed using an image that has the optimal or maximum level of focus.

Figure 1F:
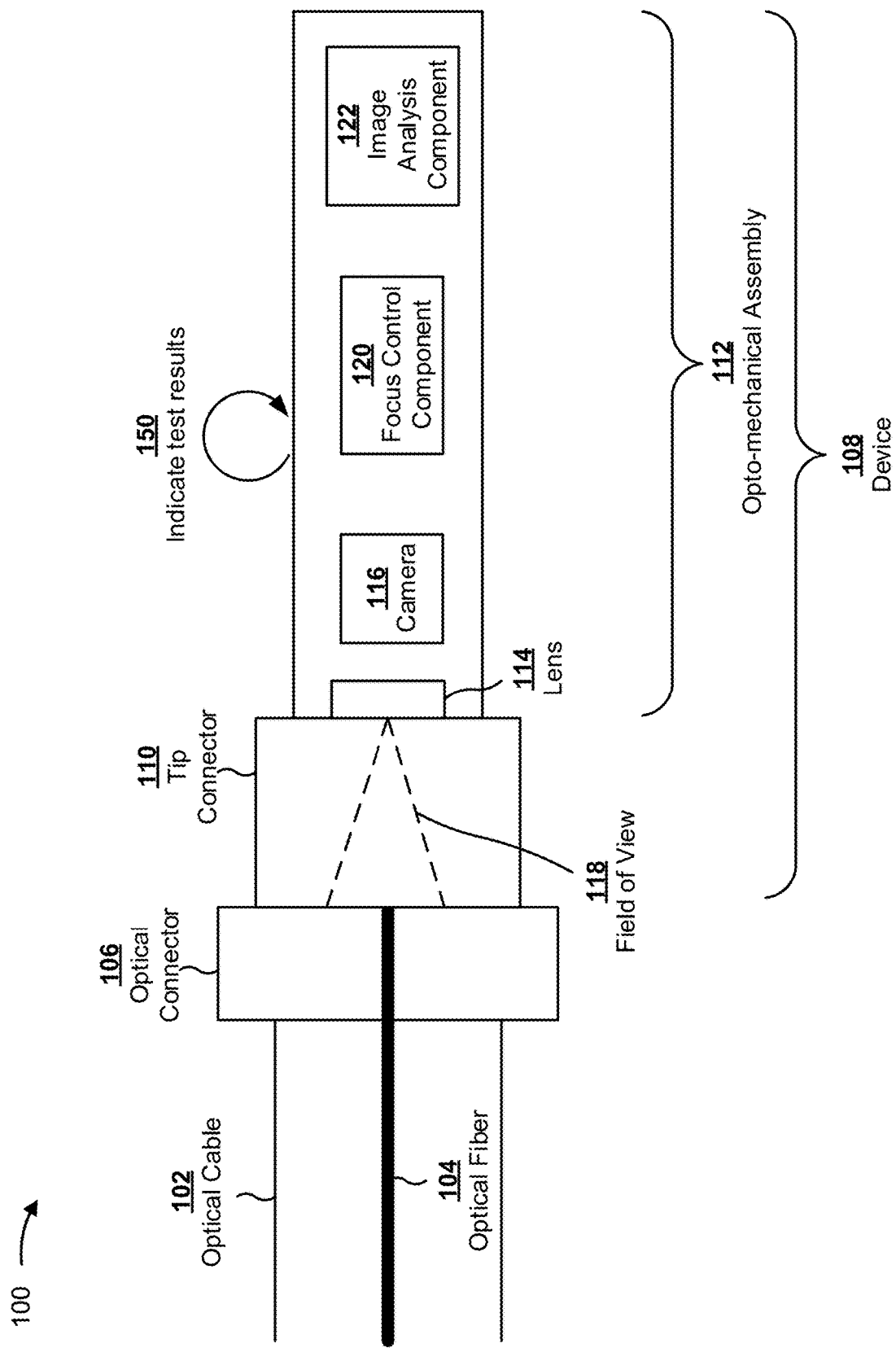
Figure 1G:
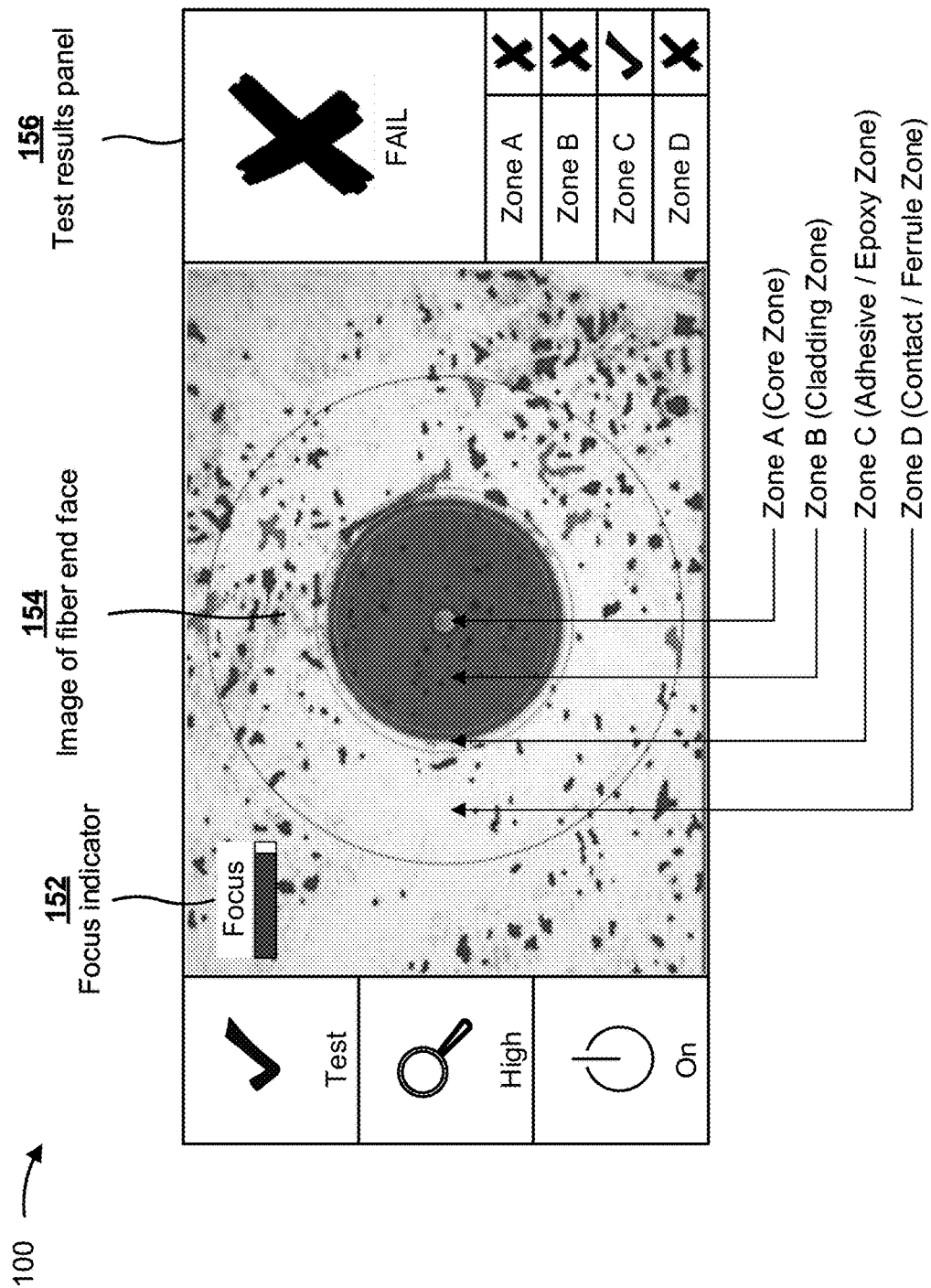

As shown in FIG. 1F, and by reference number 150, the device 108 may perform the test using the image of the end face of the optical fiber 104 at the time that the test is triggered and indicate a result of the test. For example, the device 108 may include a pass/fail indicator or integrated display that indicates whether the end face of the optical fiber 104 complies with the appropriate set of criteria related to cleanliness and damage. Additionally, or alternatively, the device 108 may generate one or more audible sounds to indicate a pass/fail result. Additionally, or alternatively, the device 108 may indicate the test results by causing the test results to be displayed on a graphical user interface. For example, as shown in FIG. 1G, and by reference number 152, the focus indicator in the graphical user interface shows the level of focus in the image at the time that the focus metric satisfied the condition to automatically initiate the test. As further shown in FIG. 1G, and by reference number 154, the graphical user interface shows the image of the end face of the optical fiber 104 that was used to perform the test.

As shown in FIG. 1G, the various speckles in the image may represent dust particles, dirt particles, debris, scratches, pits, and/or other surface defects. Accordingly, as further shown in FIG. 1G, and by reference number 156, the test results panel indicates that the end face of the optical fiber 104 fails to satisfy the set of criteria relating to cleanliness and damage, whereby the end face of the optical fiber 104 may need to be retested after having been cleaned, repaired, replaced, and/or the like. Furthermore, the graphical user interface may indicate locations and/or sizes of the surface defects that resulted in the test failing, which may aid the user or technician in remedying the surface defects. For example, in FIG. 1G, the test results panel indicates that Zone C is sufficiently free of surface defects, and that Zones A, B, and D need to be cleaned, repaired, and/or the like. In other cases, where the end face of the optical fiber 104 is sufficiently free of surface defects, the test results panel may indicate a passing test result, and a report to certify compliance with applicable quality criteria may be generated and stored (e.g., on the device 108, an external device, and/or the like).

In some implementations, the various zones may be subject to different acceptance criteria, which may further vary depending on a type associated the optical fiber 104 (e.g., based on whether the optical fiber 104 is a single-mode fiber, a multi-mode fiber, and/or the like). For example, Zone A may correspond to a core zone (e.g., a core area of the optical fiber 104 in which light signals travel through), which may have the most stringent quality requirements because any contamination in the core zone can cause back reflection, insertion loss, equipment damage, and/or the like. Furthermore, Zone B may correspond to a cladding zone, which may be formed from an optical material that surrounds and traps light in the core zone using an optical technique referred to as total internal reflection. Zone C may correspond to an adhesive (or epoxy) zone used to bond the cladding zone to Zone D, which may correspond to a contact (or ferrule) zone formed from ceramic, plastic, and/or another suitable material. Accordingly, because particles, scratches, pits, smudges, and/or the like closer to the center (core zone) of the optical fiber 104 tend to have a greater impact on performance, the pass/fail criteria, acceptance criteria, and/or the like may generally be less stringent for the cladding zone and the contact zone, and in most cases there may be no limit to the number and/or size of defects, scratches, and/or other contaminants in the adhesive zone.

As indicated above, FIGS. 1A-1G are provided merely as one or more examples. Other examples may differ from what is described with regard to FIGS. 1A-1G.

Figure 2:
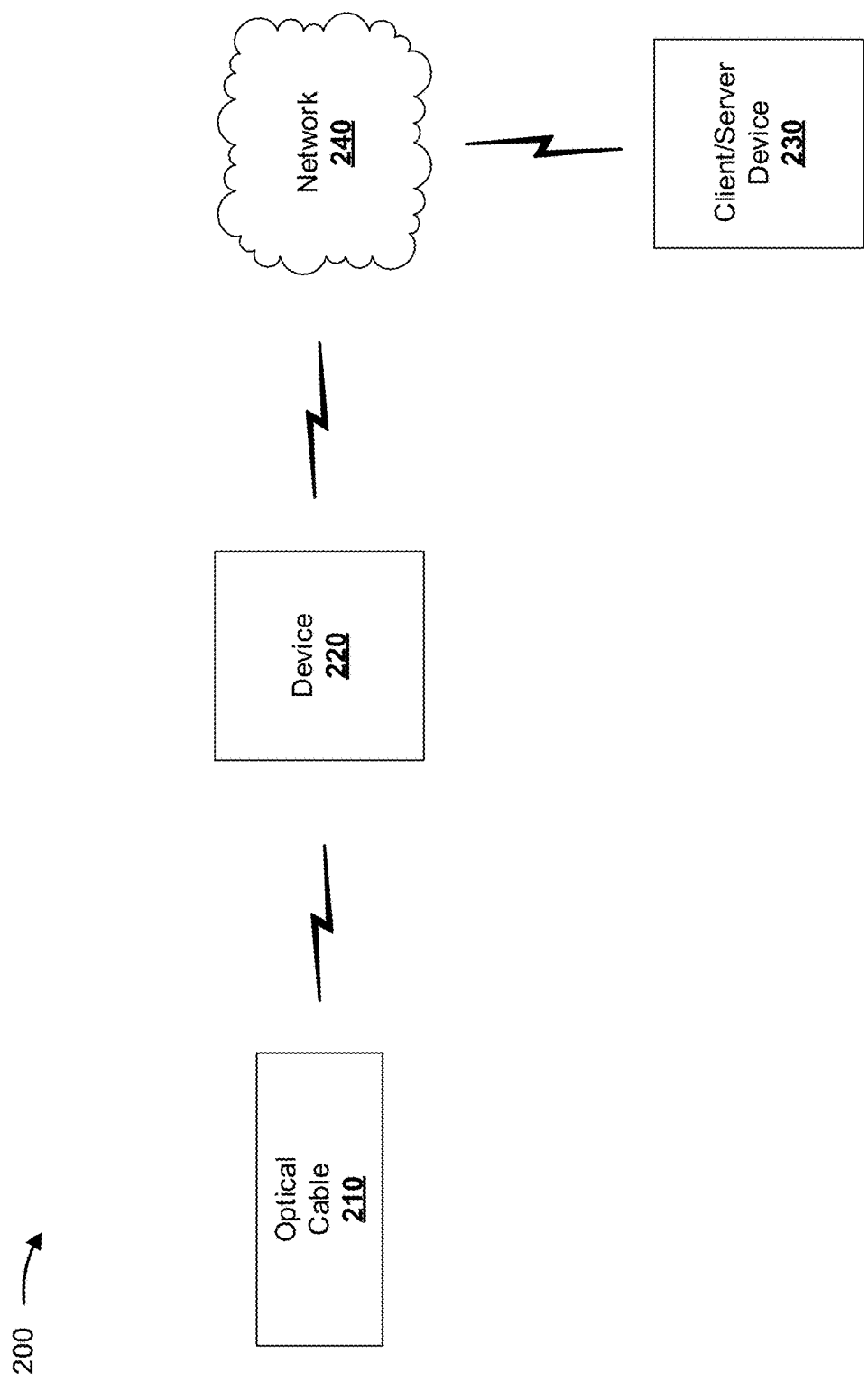
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an optical cable 210, a device 220, a client device or a server device (hereinafter referred to as client/server device 230), and a network 240. Devices of environment 200 may interconnect via wired connections, wireless connections, or a combination of wired and wireless connections.

Optical cable 210 includes a cable containing one or more optical fibers that are used to carry light from a source device to a destination device. For example, optical cable 210 may include a ribbon optical cable, a loose tube optical cable, a drop optical cable, a central core cable, and/or a similar type of cable. In some implementations, optical cable 210 may be connected to device 220 (e.g., via an optical connector and/or a tip connector), as described elsewhere herein. Additionally, or alternatively, optical cable 210 may include one or more optical fibers that have an end face to be analyzed by device 220 for cleanliness, damage, surface defects, and/or the like, as described elsewhere herein.

Device 220 includes one or more devices capable of capturing, receiving, storing, generating, processing, and/or providing information related to an automatic analysis of an end face of an optical fiber of optical cable 210. For example, device 220 may include an optical probe, an optical fiber microscope, a fault locator, an optical fiber inspection microscope, and/or a similar type of device. In some implementations, device 220 may automatically initiate a test to inspect or otherwise analyze an end face of an optical fiber of optical cable 210 when an image of the end face is manually focused, as described in further detail elsewhere herein. For example, device 220 may include an opto-mechanical assembly having one or more components for manually focusing the image of the end face of the optical fiber of optical cable 210, and device 220 may monitor a focus metric associated with the image while the image is manually focused using the opto-mechanical assembly. Accordingly, device 220 may automatically initiate the test to inspect the image for compliance with a set of criteria related to cleanliness and damage (e.g., ensuring that the end face of the optical fiber of optical cable 210 is free from dust particles, dirt particles, scratches, and/or other surface defects) when the focus metric satisfies a condition. Additionally, or alternatively, device 220 may provide a result of the test for display (e.g., via a display of device 220, a display of client/server device 230, and/or the like), as described elsewhere herein.

Client/server device 230 includes one or more devices capable of receiving, generating, storing, processing, and/or providing information associated with an automatic analysis of an end face of an optical fiber of optical cable 210. For example, client/server device 230 may include a desktop computer, a mobile phone (e.g., a smart phone or a radiotelephone), a laptop computer, a tablet computer, a wearable communication device (e.g., a smart wristwatch or a pair of smart eyeglasses), a server device, a computing resource, or a similar type of device. In some implementations, client/server device 230 may receive information related to an analysis of optical cable 210 from device 220, as described elsewhere herein. Additionally, or alternatively, client/server device 230 may provide a result of an analysis of optical cable 210 for display, as described elsewhere herein. In some implementations, client/server device 230 may be associated with a cloud computing environment. In some implementations, client/server device 230 may receive a set of images, video, and/or data from device 220 and may perform an analysis of an end face of an optical fiber using the set of images, the video, and/or the data.

Network 240 includes one or more wired and/or wireless networks. For example, network 240 may include a wireless network (e.g., a long-term evolution (LTE) network, a code division multiple access (CDMA) network, a 3G network, a 4G network, a 5G network, a Wi-Fi network, or another type of wireless network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
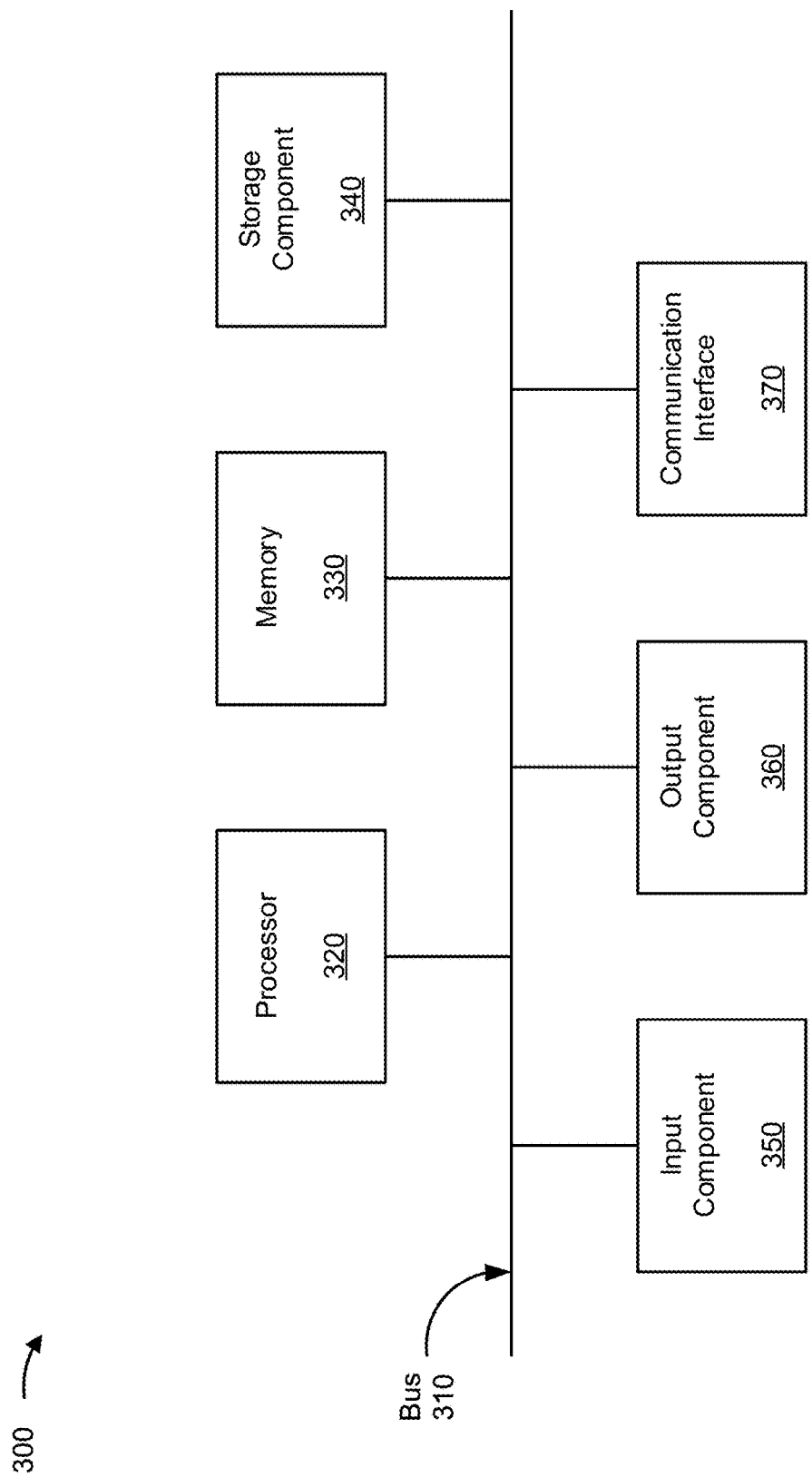
FIG. 3 is a diagram of example components of one or more devices of FIG. 2.

FIG. 3 is a diagram of example components of a device 300. Device 300 may correspond to device 220 and/or client/server device 230. In some implementations, device 220 and/or client/server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
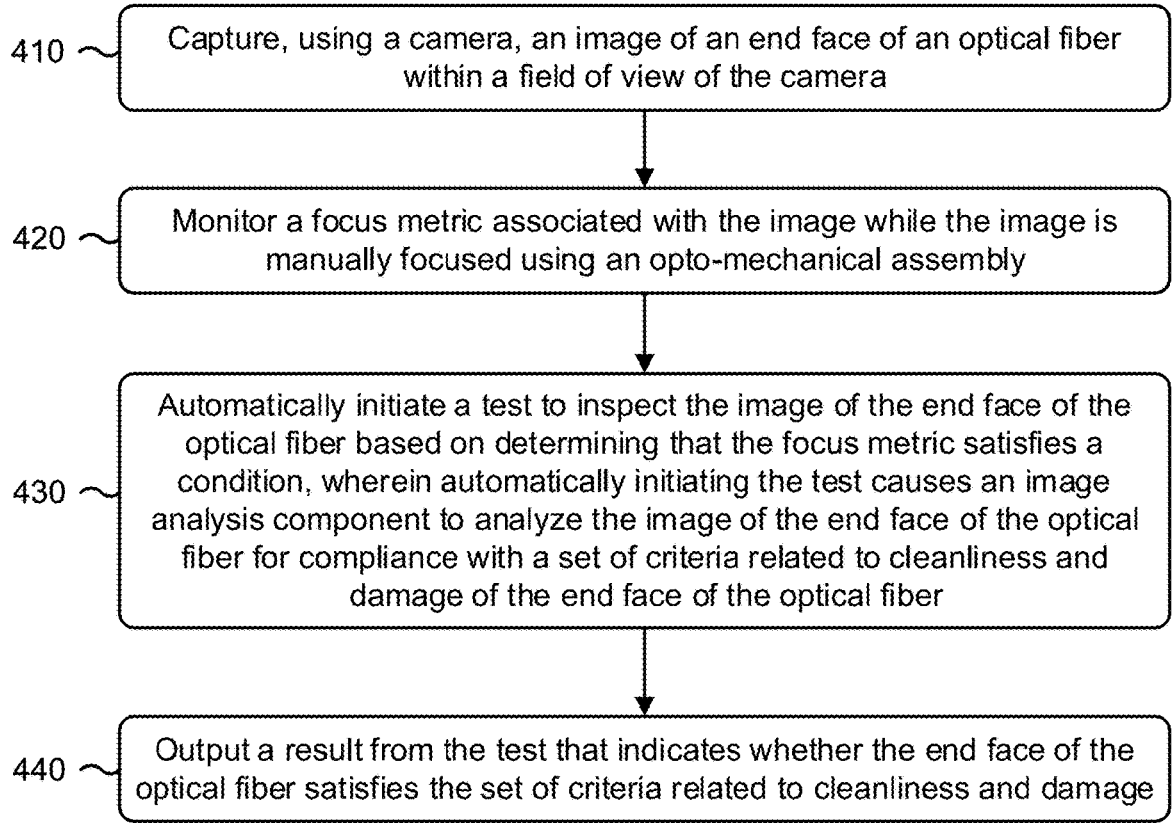
FIGS. 4-6 are flow charts of example processes for automatically executing a test to inspect an end face of an optical fiber when an image is in focus.

FIG. 4 is a flow chart of an example process 400 for automatically executing a test to inspect an end face of an optical fiber when an image is in focus. In some implementations, one or more process blocks of FIG. 4 may be performed by a device (e.g., device 220). In some implementations, one or more process blocks of FIG. 4 may be performed by another device or a group of devices separate from or including the device, such as a client/server device (e.g., client/server device 230) and/or the like.

As shown in FIG. 4, process 400 may include capturing, using a camera, an image of an end face of an optical fiber within a field of view of the camera (block 410). For example, the device (e.g., using camera 116, processor 320, memory 330, storage component 340, input component 350, output component 360, communication interface 370, and/or the like) may capture, using a camera, an image of an end face of an optical fiber within a field of view of the camera, as described above.

As further shown in FIG. 4, process 400 may include monitoring a focus metric associated with the image while the image is manually focused using an opto-mechanical assembly (block 420). For example, the device (e.g., using opto-mechanical assembly 112, processor 320, memory 330, storage component 340, input component 350, output component 360, communication interface 370, and/or the like) may monitor a focus metric associated with the image while the image is manually focused using an opto-mechanical assembly, as described above.

As further shown in FIG. 4, process 400 may include automatically initiating a test to inspect the image of the end face of the optical fiber based on determining that the focus metric satisfies a condition, wherein automatically initiating the test causes an image analysis component to analyze the image of the end face of the optical fiber for compliance with a set of criteria related to cleanliness and damage of the end face of the optical fiber (block 430). For example, the device (e.g., using image analysis component 122, processor 320, memory 330, storage component 340, input component 350, output component 360, communication interface 370, and/or the like) may automatically initiate a test to inspect the image of the end face of the optical fiber based on determining that the focus metric satisfies a condition, as described above. In some implementations, automatically initiating the test causes an image analysis component to analyze the image of the end face of the optical fiber for compliance with a set of criteria related to cleanliness and damage of the end face of the optical fiber.

As further shown in FIG. 4, process 400 may include outputting a result from the test that indicates whether the end face of the optical fiber satisfies the set of criteria related to cleanliness and damage (block 440). For example, the device (e.g., using processor 320, memory 330, storage component 340, input component 350, output component 360, communication interface 370, and/or the like) may output a result from the test that indicates whether the end face of the optical fiber satisfies the set of criteria related to cleanliness and damage, as described above.

Process 400 may include additional implementations, such as any single implementation or any combination of implementations described below and/or in connection with one or more other processes described elsewhere herein.

In a first implementation, the device may activate software that causes the device to automatically initiate the test when the image is manually focused based on a user pressing a test button on one or more of the device or a graphical user interface prior to manually focusing the image using the opto-mechanical assembly.

In a second implementation, alone or in combination with the first implementation, the device may cause a graphical user interface to display status information indicating that the test is to be automatically initiated when the focus metric satisfies the condition.

In a third implementation, alone or in combination with one or more of the first and second implementations, the condition may include that the focus metric satisfies a focus metric threshold value for a threshold time duration.

In a fourth implementation, alone or in combination with one or more of the first through third implementations, the condition may include the focus metric reaching a local maximum after passing through and backing off the local maximum.

In a fifth implementation, alone or in combination with one or more of the first through fourth implementations, the focus metric may be determined using one or more of a contrast detection technique or a phase detection technique.

In a sixth implementation, alone or in combination with one or more of the first through fifth implementations, the opto-mechanical assembly may include one or more manually operated focus control components for manually adjusting a focus of the image.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
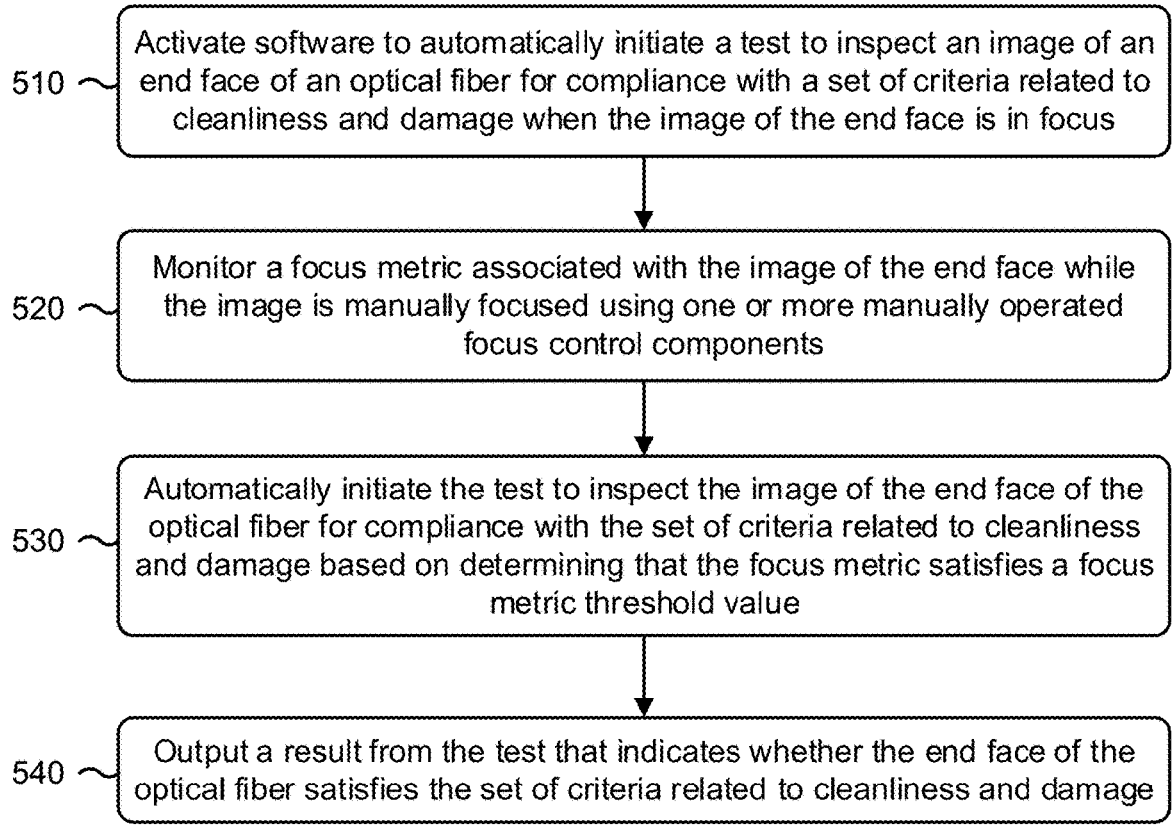

FIG. 5 is a flow chart of an example process 500 for automatically executing a test to inspect an end face of an optical fiber when an image is in focus. In some implementations, one or more process blocks of FIG. 5 may be performed by a device (e.g., device 220). In some implementations, one or more process blocks of FIG. 5 may be performed by another device or a group of devices separate from or including the device, such as a client/server device (e.g., client/server device 230) and/or the like.

As shown in FIG. 5, process 500 may include activating software to automatically initiate a test to inspect an image of an end face of an optical fiber for compliance with a set of criteria related to cleanliness and damage when the image of the end face is in focus (block 510). For example, the device (e.g., using processor 320, memory 330, storage component 340, input component 350, output component 360, communication interface 370, and/or the like) may activate software to automatically initiate a test to inspect an image of an end face of an optical fiber for compliance with a set of criteria related to cleanliness and damage when the image of the end face is in focus, as described above.

As further shown in FIG. 5, process 500 may include monitoring a focus metric associated with the image of the end face while the image is manually focused using one or more manually operated focus control components (block 520). For example, the device (e.g., using opto-mechanical assembly 112, processor 320, memory 330, storage component 340, input component 350, output component 360, communication interface 370, and/or the like) may monitor a focus metric associated with the image of the end face while the image is manually focused using one or more manually operated focus control components, as described above.

As further shown in FIG. 5, process 500 may include automatically initiating the test to inspect the image of the end face of the optical fiber for compliance with the set of criteria related to cleanliness and damage based on determining that the focus metric satisfies a focus metric threshold value (block 530). For example, the device (e.g., using image analysis component 122, processor 320, memory 330, storage component 340, input component 350, output component 360, communication interface 370, and/or the like) may automatically initiate the test to inspect the image of the end face of the optical fiber for compliance with the set of criteria related to cleanliness and damage based on determining that the focus metric satisfies a focus metric threshold value, as described above.

As further shown in FIG. 5, process 500 may include outputting a result from the test that indicates whether the end face of the optical fiber satisfies the set of criteria related to cleanliness and damage (block 540). For example, the device (e.g., using processor 320, memory 330, storage component 340, input component 350, output component 360, communication interface 370, and/or the like) may output a result from the test that indicates whether the end face of the optical fiber satisfies the set of criteria related to cleanliness and damage, as described above.

Process 500 may include additional implementations, such as any single implementation or any combination of implementations described below and/or in connection with one or more other processes described elsewhere herein.

In a first implementation, the test may be automatically initiated after the focus metric satisfies the focus metric threshold value for a threshold time duration.

In a second implementation, alone or in combination with the first implementation, the device may include a physical button to activate the software when the physical button is pressed.

In a third implementation, alone or in combination with one or more of the first and second implementations, the device may display a test button on a graphical user interface, and the software may be activated when the test button displayed on the graphical user interface is pressed.

In a fourth implementation, alone or in combination with one or more of the first through third implementations, the device may determine a value of the focus metric using one or more of a contrast detection technique or a phase detection technique.

In a fifth implementation, alone or in combination with one or more of the first through fourth implementations, the one or more manually operated focus control components may include a wheel that causes the focus of the image to be adjusted when the wheel is manually rotated.

In a sixth implementation, alone or in combination with one or more of the first through fifth implementations, the device may deactivate the software to automatically initiate the test based on a user pressing a test button on one or more of the device or a graphical user interface while the software is activated.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
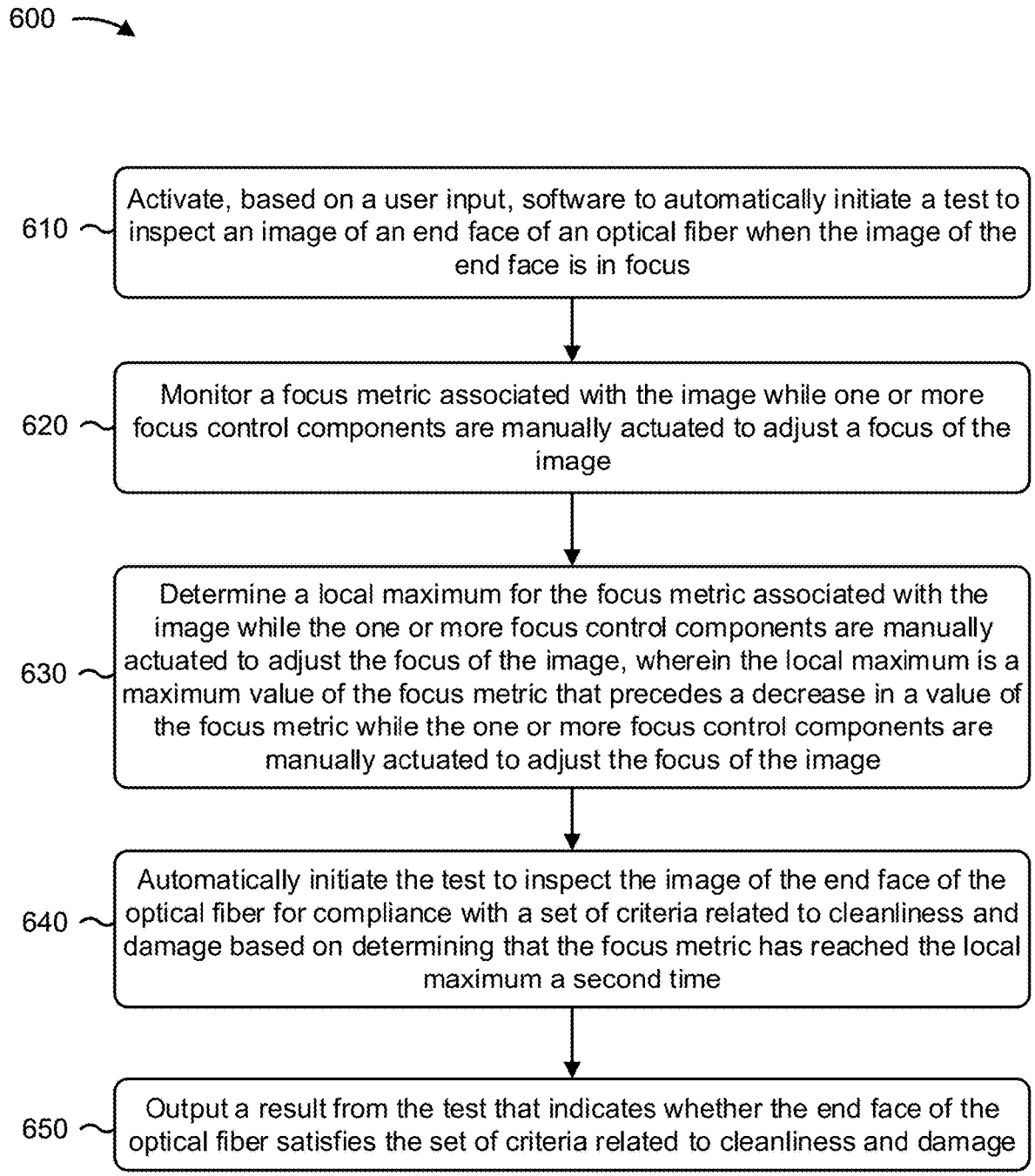

FIG. 6 is a flow chart of an example process 600 for automatically executing a test to inspect an end face of an optical fiber when an image is in focus. In some implementations, one or more process blocks of FIG. 6 may be performed by a device (e.g., device 220). In some implementations, one or more process blocks of FIG. 6 may be performed by another device or a group of devices separate from or including the device, such as a client/server device (e.g., client/server device 230) and/or the like.

As shown in FIG. 6, process 600 may include activating, based on a user input, software to automatically initiate a test to inspect an image of an end face of an optical fiber when the image of the end face is in focus (block 610). For example, the device (e.g., using processor 320, memory 330, storage component 340, input component 350, output component 360, communication interface 370, and/or the like) may activate, based on a user input, software to automatically initiate a test to inspect an image of an end face of an optical fiber when the image of the end face is in focus, as described above.

As further shown in FIG. 6, process 600 may include monitoring a focus metric associated with the image while one or more focus control components are manually actuated to adjust a focus of the image (block 620). For example, the device (e.g., using opto-mechanical assembly 112, processor 320, memory 330, storage component 340, input component 350, output component 360, communication interface 370, and/or the like) may monitor a focus metric associated with the image while one or more focus control components are manually actuated to adjust a focus of the image, as described above.

As further shown in FIG. 6, process 600 may include determining a local maximum for the focus metric associated with the image while the one or more focus control components are manually actuated to adjust the focus of the image, wherein the local maximum is a maximum value of the focus metric that precedes a decrease in a value of the focus metric while the one or more focus control components are manually actuated to adjust the focus of the image (block 630). For example, the device (e.g., using focus control component 120, processor 320, memory 330, storage component 340, input component 350, output component 360, communication interface 370, and/or the like) may determine a local maximum for the focus metric associated with the image while the one or more focus control components are manually actuated to adjust the focus of the image, as described above. In some implementations, the local maximum may be a maximum value of the focus metric that precedes a decrease in a value of the focus metric while the one or more focus control components are manually actuated to adjust the focus of the image.

As further shown in FIG. 6, process 600 may include automatically initiating the test to inspect the image of the end face of the optical fiber for compliance with a set of criteria related to cleanliness and damage based on determining that the focus metric has reached the local maximum a second time (block 640). For example, the device (e.g., using image analysis component 122, processor 320, memory 330, storage component 340, input component 350, output component 360, communication interface 370, and/or the like) may automatically initiate the test to inspect the image of the end face of the optical fiber for compliance with a set of criteria related to cleanliness and damage based on determining that the focus metric has reached the local maximum a second time, as described above.

As further shown in FIG. 6, process 600 may include outputting a result from the test that indicates whether the end face of the optical fiber satisfies the set of criteria related to cleanliness and damage (block 650). For example, the device (e.g., using processor 320, memory 330, storage component 340, input component 350, output component 360, communication interface 370, and/or the like) may output a result from the test that indicates whether the end face of the optical fiber satisfies the set of criteria related to cleanliness and damage, as described above.

Process 600 may include additional implementations, such as any single implementation or any combination of implementations described below and/or in connection with one or more other processes described elsewhere herein.

In a first implementation, the one or more focus control components may include one or more mechanical components for manually adjusting the focus of the image.

In a second implementation, alone or in combination with the first implementation, the user input may include a press of one or more of a physical button or a graphical button displayed on a user interface.

In a third implementation, alone or in combination with one or more of the first and second implementations, the device may cause a graphical user interface to display status information indicating that the test is to be automatically initiated when the image of the end face is manually focused.

In a fourth implementation, alone or in combination with one or more of the first through third implementations, the device may cause a graphical user interface to display status information indicating a level of focus in the image.

In a fifth implementation, alone or in combination with one or more of the first through fourth implementations, the device may display, via a graphical user interface, information relating to one or more of a location or a size of one or more surface defects on the end face of the optical fiber based on determining that the image of the end face of the optical fiber includes one or more features that indicate that the end face of the optical fiber is dirty or damaged.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    automatically analyzing, by a device, an image of an end face of an optical fiber for cleanliness and damage based on determining that a focus metric of the image satisfies a condition, the condition including one or more of:
        the focus metric satisfying a focus metric threshold value for a threshold time duration, or
        the focus metric reaching a local maximum after passing through and backing off the local maximum;
    determining, by the device, based on a result of analyzing the image, and based on a set of compliance criteria related to the cleanliness and damage, a compliance status for each of a plurality of zones associated with the end face of the optical fiber; and
    outputting, by the device, information indicating the compliance status for each of the plurality of zones.

2. The method of claim 1, further comprising:
    providing, for display via a graphical user interface associated with the device, the image of the end face of the optical fiber.

3. The method of claim 1, further comprising:
    providing, for display via a graphical user interface associated with the device, information indicating at least one of a location or size of a surface defect that caused a first compliance status of a first zone to indicate a failure to satisfy the set of compliance criteria.

4. The method of claim 1, wherein each of the plurality of zones is associated with different compliance criteria of the set of compliance criteria.

5. The method of claim 1, wherein the plurality of zones comprise at least two of:
    a core zone,
    a cladding zone,
    an adhesive zone, or
    a contact zone.

6. The method of claim 1, wherein the set of compliance criteria specifies:
    first compliance criteria for a first zone of the plurality of zones, and
    second compliance criteria for a second zone of the plurality of zones,
        the first zone being closer to a center of the optical fiber than the second zone, and
        the first compliance criteria being more stringent than the second compliance criteria.

7. The method of claim 1, further comprising:
    generating a report to certify compliance with the set of compliance criteria; and
    storing the report.

8. A device, comprising:
    a camera configured to capture an image of an end face of an optical fiber; and
    one or more processors configured to:
        automatically analyze the image for cleanliness and damage based on determining that a focus metric of the image satisfies a condition, the condition including one or more of:
            the focus metric satisfying a focus metric threshold value for a threshold time duration, or
            the focus metric reaching a local maximum after passing through and backing off the local maximum;
        determine based on a result of analyzing the image, and based on a set of compliance criteria related to the cleanliness and damage, a compliance status for each of a plurality of zones associated with the end face of the optical fiber;
        provide, for display via a graphical user interface associated with the device, the image; and
        provide, for display via the graphical user interface, information indicating the compliance status for each of the plurality of zones.

9. The device of claim 8, wherein the one or more processors are further configured to:
    provide, for display via the graphical user interface, information indicating at least one of a location or size of a surface defect that caused a first compliance status of a first zone to indicate a failure to satisfy the set of compliance criteria.

10. The device of claim 8, wherein each of the plurality of zones is associated with different compliance criteria of the set of compliance criteria.

11. The device of claim 8, wherein the plurality of zones comprise at least two of:
    a core zone,
    a cladding zone,
    an adhesive zone, or
    a contact zone.

12. The device of claim 8, wherein the set of compliance criteria specifies:
   first compliance criteria for a first zone of the plurality of zones, and
   second compliance criteria for a second zone of the plurality of zones,
      the first zone being closer to a center of the optical fiber than the second zone, and
      the first compliance criteria being more stringent than the second compliance criteria.

13. The device of claim 8, wherein the one or more processors are further configured to:
   generate a report to certify compliance with the set of compliance criteria; and
   store the report.

14. The device of claim 8, wherein the information indicating the compliance status specifies:
   a first zone, of the plurality of zones, satisfies the set of compliance criteria, and
   a second zone, of the plurality of zones, does not satisfy the set of compliance criteria.

15. A non-transitory computer-readable medium storing a set of instructions, the set of instructions comprising:
   one or more instructions that, when executed by one or more processors of a device, cause the device to:
      automatically analyze an image of an end face of an optical fiber for cleanliness and damage based on determining that a focus metric of the image satisfies a condition, the condition including one or more of:
         the focus metric satisfying a focus metric threshold value for a threshold time duration, or
         the focus metric reaching a local maximum after passing through and backing off the local maximum;
      determine, based on a result of analyzing the image and based on a set of compliance criteria related to the cleanliness and damage, a compliance status for each of a plurality of zones associated with the end face of the optical fiber,
         wherein the set of compliance criteria is based on a type associated with the optical fiber; and
      output information indicating the compliance status for each of the plurality of zones.

16. The non-transitory computer-readable medium of claim 15, wherein the type associated with the optical fiber includes one of:
   a single-mode optical fiber type, or
   a multi-mode optical fiber type.

17. The non-transitory computer-readable medium of claim 15, wherein the one or more instructions further cause the device to:
   provide, for display via a graphical user interface associated with the device, information indicating at least one of a location or size of a surface defect that caused a first compliance status of a first zone to indicate a failure to satisfy the set of compliance criteria.

18. The non-transitory computer-readable medium of claim 15, wherein each of the plurality of zones is associated with different compliance criteria of the set of compliance criteria.

19. The non-transitory computer-readable medium of claim 15, wherein the plurality of zones comprise at least two of:
   a core zone,
   a cladding zone,
   an adhesive zone, or
   a contact zone.

20. The non-transitory computer-readable medium of claim 15, wherein the set of compliance criteria specifies:
   first compliance criteria for a first zone of the plurality of zones, and
   second compliance criteria for a second zone of the plurality of zones,
      the first zone being closer to a center of the optical fiber than the second zone, and
      the first compliance criteria being more stringent than the second compliance criteria.

* * * * *